US007676039B2

(12) United States Patent
Seok et al.

(10) Patent No.: US 7,676,039 B2
(45) Date of Patent: *Mar. 9, 2010

(54) APPARATUS FOR CONTROLLING STORAGE AND PLAYBACK OF DIGITAL BROADCASTING CONTENTS

(75) Inventors: Jong Won Seok, Daejon (KR); Hye Joo Lee, Daejon (KR); Bum Suk Choi, Daejon (KR); Jin Woo Hong, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1469 days.

This patent is subject to a terminal disclaimer.

(21) Appl. No.: 10/716,689

(22) Filed: Nov. 18, 2003

(65) Prior Publication Data

US 2004/0103428 A1 May 27, 2004

(30) Foreign Application Priority Data

Nov. 19, 2002 (KR) ...................... 10-2002-0072038

(51) Int. Cl.
*H04N 7/167* (2006.01)
*H04N 7/16* (2006.01)

(52) U.S. Cl. ................... 380/201; 380/203; 380/210; 725/31; 725/25

(58) Field of Classification Search ................. 380/203, 380/201; 725/25
See application file for complete search history.

(56) References Cited

U.S. PATENT DOCUMENTS 6,157,719 A * 12/2000 Wasilewski et al. ......... 380/210

| 6,343,281 | B1 | 1/2002 | Kato |
| 6,381,747 | B1 | 4/2002 | Wonfor et al. |
| 6,981,272 | B1 * | 12/2005 | Morinaga et al. ............. 725/25 |
| 7,248,776 | B2 * | 7/2007 | Boston et al. ................. 386/46 |

FOREIGN PATENT DOCUMENTS

| KR | 2001-0024179 | 3/2001 |
| KR | 2001-0098760 | 11/2001 |
| KR | 10-2002-0016570 | 4/2002 |

OTHER PUBLICATIONS

Bloom, Jeffrey, et al., "Copy Protection for DVD Video", Proceedings of the IEEE, vol. 87, No. 7, Jul. 1999.

* cited by examiner

*Primary Examiner*—Kambiz Zand
*Assistant Examiner*—Aubrey H Wyszynski
(74) *Attorney, Agent, or Firm*—Blakely, Sokoloff, Taylor & Zafman LLP

(57) ABSTRACT

Provided is an apparatus for controlling storage and playback of digital broadcasting contents. The apparatus can control a broadcasting content to be recorded and stored, temporarily stored, and played back while protecting and managing it securely. The apparatus of the present research includes: a control information providing unit for generating control information for recording storage, temporary storage, and playback of a broadcasting content, using the control information as watermarking information, multiplexing and scrambling the broadcasting content including the control information, and outputting a scrambled transport; and a storing and playback unit for storing the broadcasting content by using the control information, comparing the control information stored together with the broadcasting content with control information added as watermarks, and determining whether to play back the broadcasting content.

14 Claims, 7 Drawing Sheets

FIG. 2

| Control Information | Meaning | Payload |
|---|---|---|
| CCI: 2bits | Copy Free | 00 |
| | No More Copy | 01 |
| | One Copy | 10 |
| | Never Copy | 11 |
| BF: 2bits | Broadcasting Flag | 00 |
| RI: 3bits | Forever | 000 |
| | 1 week | 001 |
| | 3 days | 101 |
| | 1 days | 011 |
| | 12 hours | 100 |
| | 6 hours | 101 |
| | 3 hours | 110 |
| | 1 hours | 111 |

201 — CCI: 2bits
202 — BF: 2bits
203 — RI: 3bits

FIG. 4

| CCI before Change | CCI after Change | |
|---|---|---|
| Free Copy | Free Copy | Storing of content is possible |
| No More Copy | One Copy | Storing of content not allowed |
| Never Copy | Never Copy | Storing of content is impossible |
| One Copy | No More Copy | Storing of content is possible |

FIG. 6

| CCI | Watermarked CCI | |
|---|---|---|
| Free Copy | Free Copy | Playback is possible |
| | One Copy | Playback is impossible |
| | No More Copy | Playback is not allowed |
| | Never Copy | Playback is impossible |
| No More Copy | Free Copy | Playback is impossible |
| | One Copy | Playback is possible |
| | No More Copy | Playback is not allowed |
| | Never Copy | Playback is impossible |
| Never Copy | Free Copy | Playback is impossible |
| | One Copy | Playback is impossible |
| | No More Copy | Playback is not allowed |
| | Never Copy | Playback is impossible |
| One Copy | Free Copy | Playback is impossible |
| | One Copy | Playback is impossible |
| | No More Copy | Playback is not allowed |
| | Never Copy | Playback is impossible |

APPARATUS FOR CONTROLLING STORAGE AND PLAYBACK OF DIGITAL BROADCASTING CONTENTS

FIELD OF THE INVENTION

The present invention relates to an apparatus for storing and playing back digital broadcasting contents; and, more particularly, to an apparatus for controlling digital broadcasting contents to be recorded and stored, temporarily stored and played back in a digital broadcasting transceiver.

DESCRIPTION OF RELATED ART

In the future, digital broadcasting technology will be developed from current one-way broadcasting to data broadcasting and interactive broadcasting. Since broadcasting environment has relatively wider bandwidth than conventional Internet broadcasting, it can provide high-quality and high-resolution broadcasting contents.

In a digital broadcasting environment, broadcasting contents are transmitted in the form of transport stream (TS) which is obtained by pocketing the broadcasting contents in a method of Moving Picture Experts Group (MPEG) compression. In case of fee-charging contents, or pay broadcasting contents, the broadcasting contents are transmitted after encrypted or scrambled by using access control technology so that only authentic subscribers can watch the broadcasting contents. The authentic subscribers decrypt the broadcasting contents with a key for decrypting the encrypted or scrambled broadcasting contents and watch them. Recent digital broadcasting receivers come in with a storage, such as a hard disk, to store the broadcasted digital contents.

However, conventional methods store the broadcasting contents stored in the hard disk after they are decrypted or descrambled. This makes the decrypted or descrambled contents be leaked outside, which is undesirable. Also, in the conventional methods, it is impossible to store and play back the broadcasting contents based on the kind of broadcasting contents and service conditions. One of the many new services that can be provided in the digital broadcasting environment is temporal storage of broadcasting contents. If a broadcasting content is stored temporarily, it should be managed properly. Therefore, it is necessary to control the storage and playback of broadcasting contents based on the type of service in the digital broadcasting environment.

SUMMARY OF THE INVENTION

It is, therefore, an object of the present invention to provide an apparatus for controlling digital broadcasting contents to be recorded and stored, temporarily stored and played back based on a service in a transmitter and a receiver of a digital broadcasting environment, as well as protecting and managing the broadcasting contents securely.

In accordance with an aspect of the present invention, there is provided an apparatus for storing and playing back digital broadcasting contents, including: a control information providing unit for generating control information for recording storage, temporary storage, and playback of a broadcasting content, using the control information as watermarking information, multiplexing and scrambling the broadcasting content including the control information, and outputting a scrambled transport; and a storing and playback unit for storing the broadcasting content by using the control information, comparing the control information stored together with the broadcasting content with control information added as watermarks, and determining whether to play back the broadcasting content.

In accordance with another aspect of the present invention, there is provided an apparatus for controlling storage and playback of digital broadcasting contents in a transmitter of a digital broadcasting environment, including: an access control unit for generating access control information for access control service and a control word; a copy control information (CCI) generation unit for generating copy control information; a broadcasting flag (BF) generation unit for generating broadcasting flag; a retention information (RI) generation unit for generating retention information; a watermarking unit for receiving the CCI, the BF and the RI and watermarking an uncompressed media signal with the CCI, the BF and the RI to thereby generate a watermarked media signal; a media encoding unit for compressing the watermarked media signal; a multiplexing unit for receiving and multiplexing the watermarked and compressed media signal, the access control information, the CCI, the BF, and the RI to thereby generate multiplexed transport stream; and a scrambling unit for scrambling the multiplexed transport stream based on the control word and transmitting the scrambled transport stream.

In accordance with another aspect of the present invention, there is provided an apparatus for controlling storage and playback of digital broadcasting contents in a receiver of a digital broadcasting environment, including: a personal information providing unit for providing personal information to decode a scrambled transport stream; a descrambling unit for descrambling the scrambled transport stream based on the personal information; a control information processing unit for processing the CCI, the BF, the RI, which are storage and playback control information included in the descrambled transport stream, and storing and playing back the broadcasting content; an encrypting unit for encrypting the broadcasting content to be stored; a storing unit for storing the encrypted broadcasting content; a decrypting unit for decrypting the stored broadcasting content; a decoding unit for decoding the descrambled and compressed transport stream; and a playback allowing unit for abstracting the CCI, the BF and the RI, which are watermarks, from the decoded transport stream, comparing the abstracted watermark information with the storage and playback control information, and determining whether to allow playback of the broadcasting content.

The present invention provides a technology for controlling digital broadcasting contents to be recorded and stored, temporarily stored and played back in the digital broadcasting environment. For safe storage and playback control, the transmitter should provide information for the storage and playback control, and the receiver should control the broadcasting contents to be stored after recorded, stored temporarily and played back or the broadcasting contents stored in the hard disk properly.

In the present invention, information for controlling storage and playback of the broadcasting contents (i.e., storage and playback control information) is generated in the transmitter and used as watermarking information, and the storage and playback control information is included in a multiplexer. Then, the receiver stores the broadcasting contents by using the storage and playback control information. When the broadcasting contents are played back, the storage and playback control information stored in a storage unit is compared with the storage and playback control information added as a watermark to determine whether to play back the broadcasting contents.

BRIEF DESCRIPTION OF THE DRAWINGS

The above and other objects and features of the present invention will become apparent from the following description of the preferred embodiments given in conjunction with the accompanying drawings, in which:

FIG. 2 is a diagram illustrating control information for storing and playing back digital broadcasting contents in accordance with an embodiment of the present invention;

FIG. 4 is a diagram illustrating how copy control information is changed in a control information processing unit, when a broadcasting content is stored in the controlling apparatus of the receiver in accordance with an embodiment of the present invention;

FIG. 6 is a diagram describing a relationship between control information of a watermark abstracting unit and control information of a control information processing unit in the controlling apparatus of the receiver in accordance with an embodiment of the present invention.

DETAILED DESCRIPTION OF THE INVENTION

Other objects and aspects of the invention will become apparent from the following description of the embodiments with reference to the accompanying drawings, which is at forth hereinafter.

Figure 1:
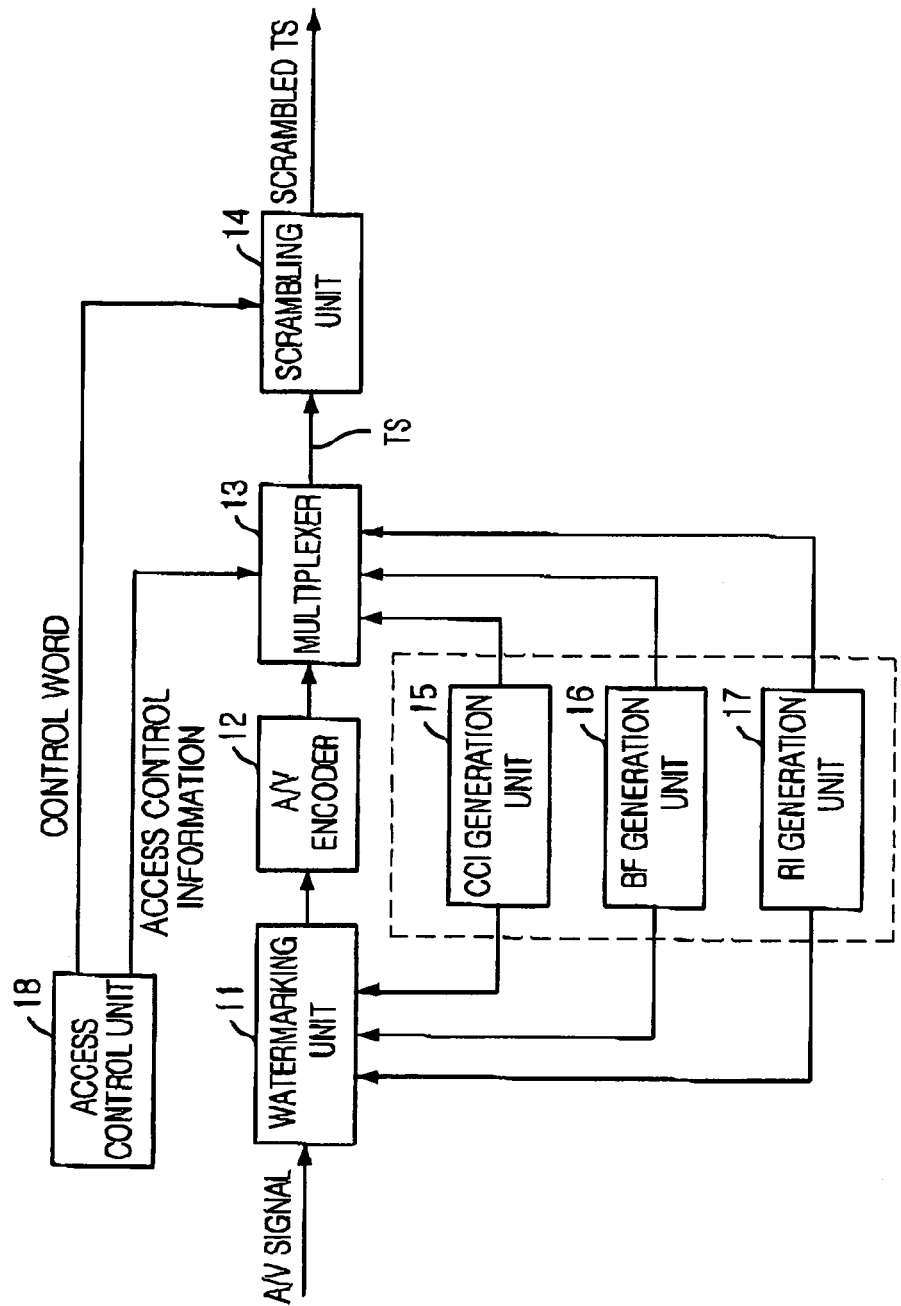
FIG. 1 is a block diagram showing an apparatus for controlling the storage and playback of digital broadcasting contents in a transmitter in accordance with an embodiment of the present invention.

FIG. 1 shows an apparatus for controlling storage and playback of a digital broadcasting content in a transmitter in accordance with an embodiment of the present invention. Referring to FIG. 1, the controlling apparatus in the transmitter includes: a watermarking unit 11, an audio and/or video (A/v) encoder 12, a multiplexer 13, a scrambling unit 14, a copy control information (CCI) generation unit 15, a broadcasting flag (BF) generation unit 16, a retention information (RI) generation unit 17, and an access control unit 18.

The access control unit 18 generates access control information for access control service and a control word, and the CCI generation unit generates copy control information. The BF generation unit 16 generates broadcasting flag, while the RI generation unit 17 generates retention information.

The watermarking unit 11 receives the CCI, the BF and the RI, uses them as watermarks, and watermarks an uncompressed media signal. The media signal includes both audio and video signals.

The A/V encoder 12 compresses the watermarked media signal. The multiplexer 13 receives and multiplexes the compressed and watermarked media signal, the access control information, the CCI, the BF and the RI. The scrambling unit 14 scrambles the multiplexed transport stream to generate scrambled transport stream and transmits the scrambled transport steam to a receiver.

The apparatus for controlling storage and playback of digital broadcasting contents in the transmitter is operated as follows. The watermarking unit 11 receives information, the CCI, the BF and the RI, respectively, from the CCI generation unit 15, the BF generation unit 16, and the RT generation unit 17 and performs watermarking by using them as watermark data.

Here, the watermarked A/V signal is compressed in the A/V encoder 12 and transmitted to the multiplexer 13. Then, the watermarked A/V signal is compressed in the A/V encoder 12 and transmitted to the multiplexer 13. The multiplexer 13 receives the compressed A/V signal, the access control information, the CCI, the BF and the RI and multiplexes them.

That is, the CCI, the BF and the RI which ate used for storage and playback control are used both in the watermarking unit and the multiplexer 13 simultaneously. Subsequently, the multiplexed transport stream is scrambled in the scrambling unit 14 based on a control word transmitted from the access control unit IS and then outputted.

The CCI, the BF and the RI are used in the receiver (see FIG. 3) for storage and playback control. The CCI, the BF and the RI, which are storage and playback information, are as illustrated in FIG. 2.

FIG. 2 is a diagram illustrating control information for storing and playing back digital broadcasting contents in accordance with an embodiment of the present invention. The CCI 201 is information for determining whether a broadcasting content can be copied or not. It has four states: "Free copy", "one copy", "no more copy" and "never copy". The transmitter selects one of the four states when it transmits a broadcasting content.

The BF 202 is an identifier which indicates that the content is an authentic content. It is used to limit the use of the content to the purpose of broadcasting only. In short, it is information that tells whether the content is a broadcasting content or not.

The RI 203 indicates retention time of a broadcasting content, when the broadcasting content is stored in the hard disk of the receiver. After the retention time set up by the transmitter is passed, the stored broadcasting content is removed automatically from the hard disk of the receiver.

The CCI 201, the BF 202 and the RI 203 are watermarked for an A/V content in the watermarking unit 11. They are also carried on the transport stream in the multiplexer 13.

Figure 3:
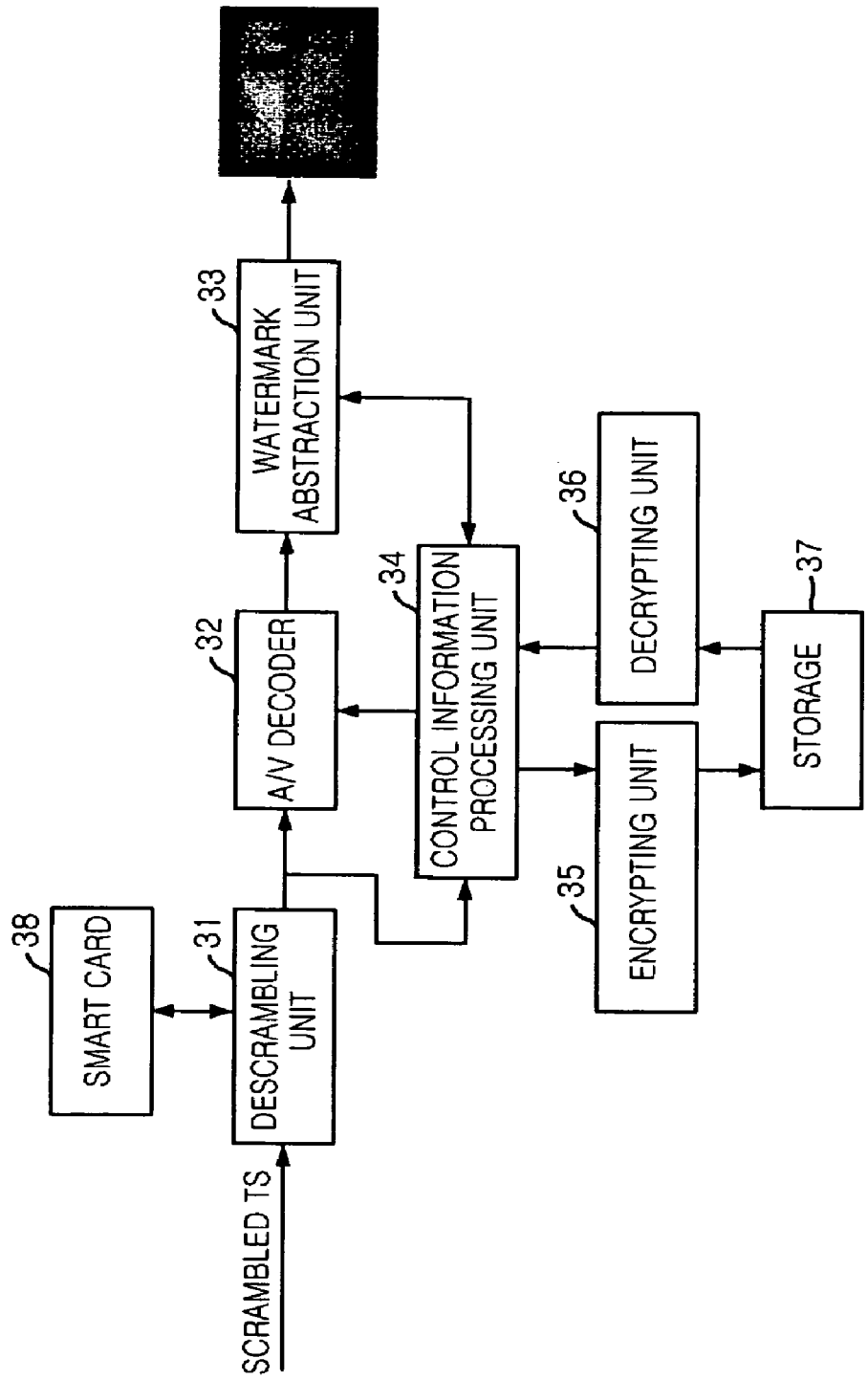
FIG. 3 is a block diagram showing an apparatus for controlling the storage and playback of digital broadcasting contents in a receiver in accordance with an embodiment of the present invention.

FIG. 3 shows an apparatus for controlling the storage and playback of a digital broadcasting content in a receiver in accordance with an embodiment of the present invention. Referring to FIG. 3, the controlling apparatus in the receiver includes: a descrambling unit 31, an A/V decoder 32, a watermark abstracting unit 33, a control information processing unit 34, an encrypting unit 35, a decrypting unit 36, a storage 37 and a smart cart 38.

The smart cart 38 provides personal information to decode the scrambled transport stream. The descrambling unit 31 descrambles the scrambled transport stream based on the personal information. The control information processing unit 34 processes the CCI, the BF, the RI, which are the storage and playback control information included in the descrambled transport stream, and stores and plays back the broadcasting content.

The encrypting unit 35 stores the broadcasting content. The storage 37 stores the encrypted broadcasting content. The decrypting unit 36 decrypts the stored broadcasting content. An A/V decoder 32 decodes the descrambled and compressed transport stream. The watermark abstracting unit 33 abstracts the CCI, the BF and the RI, which are watermarks, from the decoded transport stream, compares the abstracted watermark information with the storage and playback control information (which includes the CCI, the BF and the RI), and determines whether to allow playback of the broadcasting content.

Figure 5:
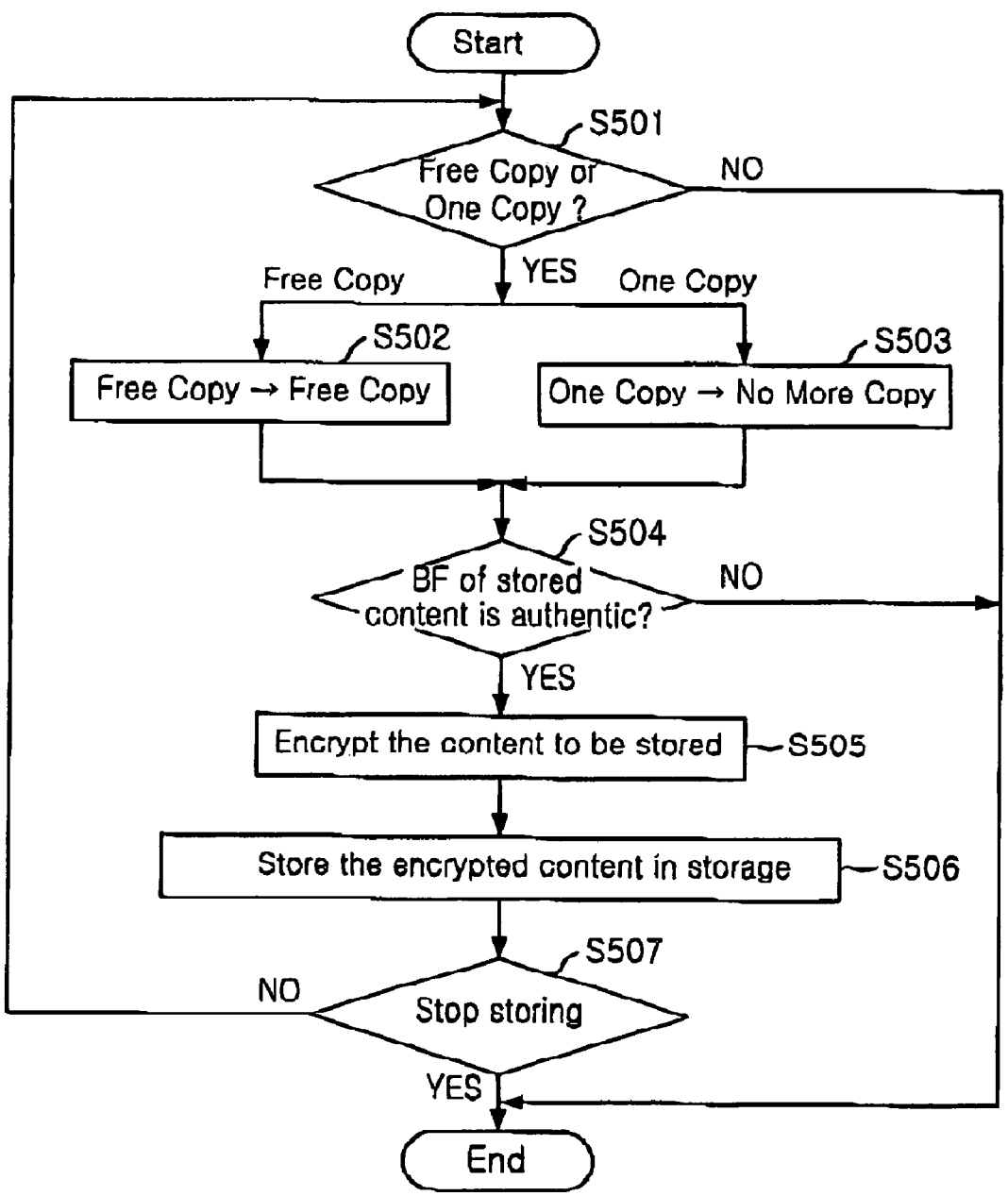
FIG. 5 is a flowchart depicting a process for storing a broadcasting content in the controlling apparatus of the receiver in accordance with an embodiment of the present invention.

Referring to FIGS. 4 and 5, the operation of the controlling apparatus in the receiver will be described, hereafter. First, when a broadcasting content is stored in the receiver, the scrambled transport stream is inputted. Then, the descrambling unit 31 abstracts an encrypted key out of the transport stream and decrypts the key by using information stored in the smart card 38. Subsequently, descrambling is performed by using the decrypted key.

The control information processing unit 34 checks whether the CCI, the BF and the RI stored in the transport stream (see FIG. 5). Here, at steps S501 through S503, the control information processing unit 34 changes the CCI and, at step S504, it is checked whether the stored content is an authentic broadcasting content by using the BF. At step. S505, the broadcasting content to be stored is transmitted to the encrypting unit 35 and encrypted. At step S506, the encrypted broadcasting content is stored in the storage 37.

FIG. 4 is a diagram illustrating how copy control information is changed in a control information processing unit, when a broadcasting content is stored in the controlling apparatus of the receiver in accordance with an embodiment of the present invention. Referring to FIG. 4, when a broadcasting content is transmitted from the transmitter (see FIG. 1), one of the "free copy," "one copy," and "never copy" states should be selected. Here, the state "no more copy" is not allowed.

In case of "free copy" state, at steps S501 and S502, the CCI can be maintained and stored without any change. In case of "one copy" state, at the steps S501 and S503, it is changed into "no more copy" state and stored. In case of "never copy" state, it cannot be stored.

Figure 7:
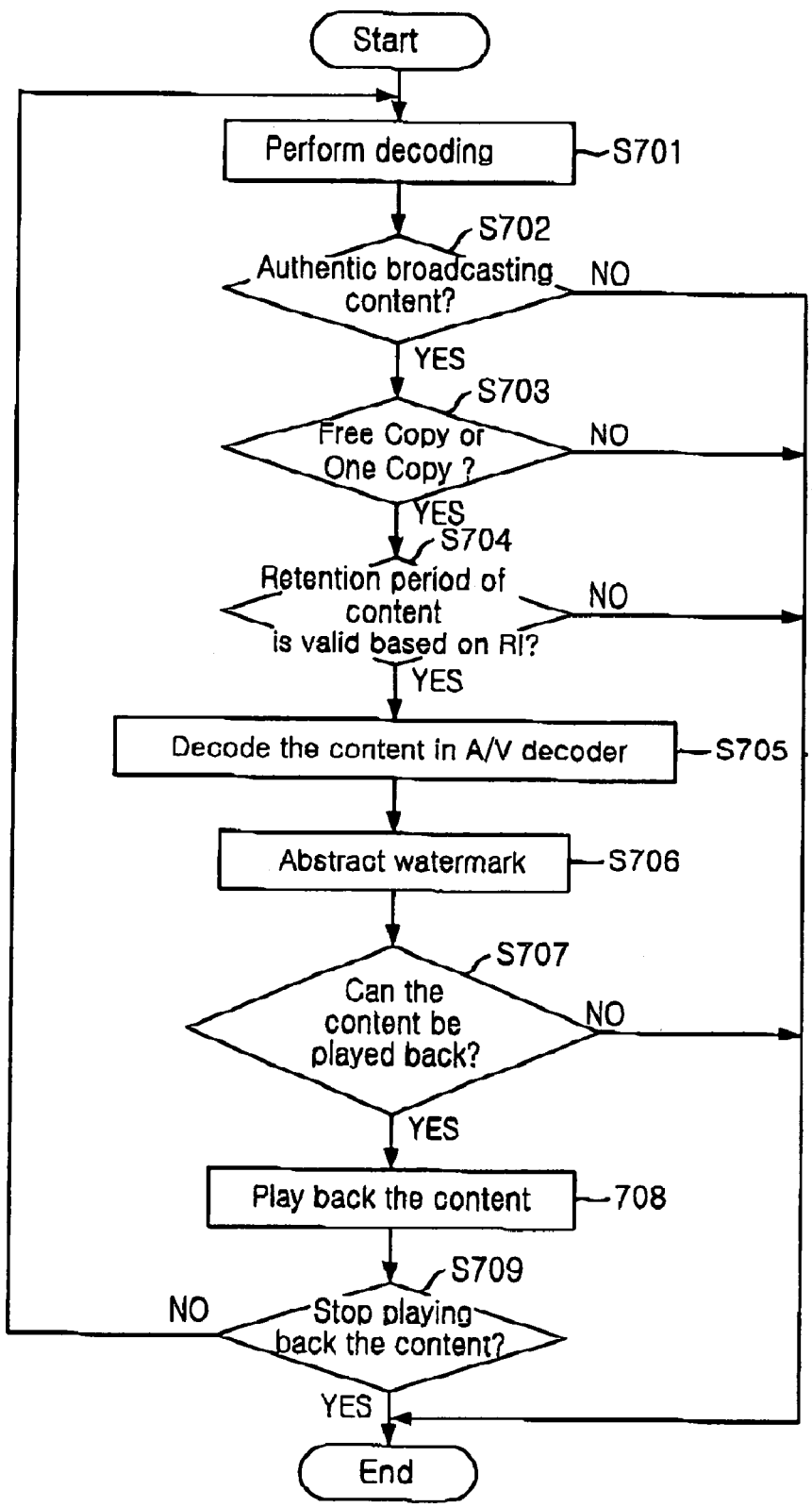
FIG. 7 is a flowchart illustrating a process for controlling the playback of a broadcasting content in the controlling apparatus of the receiver in accordance with an embodiment of the present invention.

Meanwhile, referring to FIG. 7, when the broadcasting content stored in the receiver is played back, at step S701, the broadcasting content that is encrypted and stored in the storage 27 is decrypted in the decrypting unit 36 and then transmitted to the control information processing unit 34.

Subsequently, at step S702, the control information processing unit 34 determines whether the broadcasting content is an authentic broadcasting content by checking out the BF. Then, at step s703, it determines whether the broadcasting content can be played back by checking out the CCI. Subsequently, at step S704, it determines whether the retention period of the broadcasting content is valid by checking the RI and then transmits the broadcasting content to the A/V decoder 32.

At step S705, the A/V decoder 32 decodes the broadcasting content transmitted from the control information processing unit 34. Here, the decoded broadcasting content is transmitted to the watermark abstracting unit 33 and, at step S706, the watermark abstracting unit 33 abstracts control information which is added as a watermark. At step S707, the abstracted control information is compared with the playback control information transmitted from the control information processing unit 34 and, at step S708, it is determined whether the broadcasting content can be played back.

FIG. 6 shows a relationship between the control information abstracted by a watermark abstracting unit 33 and the control information from the control information processing unit 34 and whether the broadcasting content can be played back based on the relationship.

As described in FIG. 4, the CCI of the stored broadcasting content is in the state of either "free copy" or "no more copy." The CCI watermarked to the broadcasting content is one among the three states of "free copy," "one copy," or "never copy." Among them, the state "never copy" is a state that the broadcasting content is not allowed to be stored. Therefore, it has nothing to do with the playback of the stored broadcasting content.

The state "free copy" is maintained without change when the broadcasting content is stored. Therefore, the broadcasting content can be played back. In case of "no more copy," the broadcasting content can be played back, because "one copy" is changed to the "no more copy," when the broadcasting content is stored.

To take an example, when the CCI of a broadcasting content is "never copy," the CCI added to the broadcasting content as a watermark is also "never copy." If there is a hacker and the hacker changes the "never copy" to "free copy," the broadcasting content can be stored because the CCI of the broadcasting content is "free copy." However, when the broadcasting content stored successfully is played back, the watermark is abstracted and it is revealed that the CCI of the broadcasting content is "nev r copy." Since this means that the broadcasting content is not allowed to be played back when the information of FIG. 6 is used, the broadcasting content cannot be played back.

Temporary storing of a broadcasting content is related to a time shifting function of digital broadcasting. When a viewer, or a subscriber, watches a broadcasting content with the receiver and the user need to move out for a while, the content being broadcasted can be stored temporarily. If the viewer resumes to watch the broadcasting content, the temporary storage stops and the broadcasting content is played back from the point where the temporary storage has started.

Consequently, the broadcasting content is stored on and on for the retained time until the program the viewer is watching, i.e., the broadcasting content, finishes. In this case, if temporary storage is selected in the receiver, the broadcasting content to be stored temporarily is not processed in the control information processing unit 34, not encrypted in the encrypting unit 35, and stored in the storage directly. When the broadcasting content finishes, the broadcasting content which is delayed as much as stored in the storage 37 is deleted, automatically.

The controlling apparatus of the present invention can protect and manage broadcasting contents securely while controlling them to be recorded and stored, temporarily stored and played back based on various types of service at the transmitter and receiver in a digital broadcasting environment.

While the present invention has been described with respect to certain preferred embodiments, it will be apparent to those skilled in the art that various changes and modifications may be made without departing from the scope of the invention as defined in the following claims.

What is claimed is:

1. An apparatus for controlling storage and playback of digital broadcasting contents in a transmitter of a digital broadcasting environment, comprising:

an access control means for generating: (a) access control information for access control service and (b) control word for scrambling;

a copy control information (CCI) generation means for generating copy control information;

a broadcasting flag (BF) generation means for generating broadcasting flag;

a retention information (RI) generation means for generating retention information;

a watermarking means for receiving the CCI, the BF and the RI and watermarking an uncompressed media signal with the CCI, the BF and the RI to thereby generate a watermarked media signal;

a media encoding means for compressing the watermarked media signal; a multiplexing means for receiving and multiplexing the watermarked and compressed media signal, the access control information, the CCI, the BF, and the RI to thereby generate multiplexed transport stream; and a scrambling means for scrambling the multiplexed transport stream based on the control word and transmitting the scrambled transport stream.

2. The apparatus as recited in claim 1, wherein the CCI is information for determining whether a broadcasting content can be copied.

3. The apparatus as recited in claim 1, wherein the BF is information for determining whether a content is a broadcasting content.

4. The apparatus as recited in claim 1, wherein the RI indicates retention time of a broadcasting content when the broadcasting content is stored in a hard disk.

5. An apparatus for controlling storage and playback of digital broadcasting contents in a receiver of a digital broadcasting environment, comprising:

a personal information providing means for providing personal information to decode a scrambled transport stream;

a descrambling means for descrambling the scrambled transport stream based on the personal information;

a control information processing means for processing a copy control information (CCI), a broadcasting flag (BF), a retention information (RI), which are storage and playback control information included in the descrambled transport stream, and storing and playing back the broadcasting content;

an encrypting means for encrypting the broadcasting content to be stored;

a storing means for storing the encrypted broadcasting content;

a decrypting means for decrypting the stored broadcasting content;

a decoding means for decoding the descrambled and compressed transport stream; and a playback allowing means for abstracting the CCI, the BF and the RI, which are watermarks, from the decoded transport stream, comparing the abstracted watermark information with the storage and playback control information, and determining whether to allow playback of the broadcasting content.

6. The apparatus as recited in claim 5, wherein the control information processing means changes the CCI included in the transport stream based on the kind of a broadcasting content, when the broadcasting content is stored.

7. The apparatus as recited in claim 5, wherein the control information processing means checks the BF included in the transport stream based on the kind of a broadcasting content, and stores and plays back the broadcasting content.

8. The apparatus as recited in claim 5, wherein the control information processing means checks whether the retention period is valid by checking the RI included in the transport stream based on the kind and service of a broadcasting content, and plays back the broadcasting content.

9. The apparatus as recited in claim 5, wherein the CCI indicates whether a broadcasting content can be copied and the BF indicates whether the content is an authentic broadcasting content, while the RI indicates retention time of a broadcasting content stored in the hard disk of the receiver.

10. The apparatus as recited in claim 9, wherein the playback allowing means abstracts the watermarked CCI, the watermarked BF, and the watermarked RI, compares the CCI, BF and RI which are abstracted as watermarks with the CCI, BE and RI included in the transport stream, and determines whether to allow the broadcasting content to be played back.

11. The apparatus as recited in claim 10, wherein a broadcasting content to be stored temporarily is not processed in the control information processing means, not encrypted in the encrypting means, and stored in the storing means directly and, when the broadcasting content is played back to an end, the broadcasting content which is delayed as much as temporarily stored in the storage means is deleted automatically.

12. An apparatus for storing and playing back digital broadcasting contents, comprising:

a control information providing means for generating control information for recording storage, temporary storage, and playback of a broadcasting content, using the control information as watermarking information, multiplexing and scrambling the broadcasting content including the control information, and outputting a scrambled transport; and a storing and playback means for storing the broadcasting content by using the control information, comparing the control information stored together with the broadcasting content with control information added as watermarks, and determining whether to play back the broadcasting content;

wherein the control information providing means includes;

an access controlling means for generating access control information for access control service and a control word;

a CCI generation means for generating the CCI; a BF generation means for generating the BF; a RI generation means for generating the RI;

a watermarking means for receiving the CCI, the BF, and the RI, and watermarking an uncompressed media signal by using the CCI, the BF, and the RI as watermarks;

an encoding means for compressing the watermarked media signal;

a multiplexing means for receiving and multiplexing the watermarked and compressed media signal, the access control information, the CCI, the BF, and the RI; and a scrambling means for scrambling a multiplexed transport stream based on the control word and transmitting the scrambled transport stream.

13. The apparatus as recited in claim 12, wherein the control information includes CCI information for determining whether the broadcasting content can be copied, BF information for determining whether the broadcasting content is an authentic broadcasting content, and RI information for indicating retention time of the broadcasting content stored in a hard disk of the storing and playback means.

14. The apparatus as recited in claim 12, wherein the storing and playback means includes:

a personal information providing means for providing personal information for decoding the scrambled transport stream;

a descrambling means for descrambling the scrambled transport stream based on the personal information;

a control information processing means for processing the CCI, the BF and the RI, which are the storage and playback control information included in the descrambled transport stream, and storing and playing back the broadcasting content;

an encrypting means for encrypting the broadcasting content to be stored;

a storing means for storing the encrypted broadcasting content;

a decrypting means for decrypting the stored broadcasting content;

a decoding means for decoding the descrambled and compressed transport stream; and a playback allowing means for abstracting the CCI, the BF and the RI, which are watermarks, from the decoded transport streams compares the abstracted watermark information with the storage and playback information, and determining whether to allow playback of the broadcasting content.

* * * * *